United States Patent
Bialkowski et al.

(10) Patent No.: US 9,065,747 B2
(45) Date of Patent: Jun. 23, 2015

(54) NETWORK INTERFACE AND METHOD OF AGGREGATING PROCESSOR CIRCUITS

(71) Applicant: Infinera Corp., Annapolis Junction, MD (US)

(72) Inventors: Jan Bialkowski, San Jose, CA (US); Charles A. Moorwood, Sunnyvale, CA (US)

(73) Assignee: Infinera Corp., Sunnyvale, CA (US)

( * ) Notice: Subject to any disclaimer, the term of this patent is extended or adjusted under 35 U.S.C. 154(b) by 0 days.

(21) Appl. No.: 13/730,483

(22) Filed: Dec. 28, 2012

(65) Prior Publication Data

US 2014/0186034 A1 Jul. 3, 2014

(51) Int. Cl.
 *H04J 14/00* (2006.01)
 *H04L 12/801* (2013.01)

(52) U.S. Cl.
 CPC ............... *H04L 47/12* (2013.01); *H04L 47/34* (2013.01)

(58) Field of Classification Search
 CPC ....... H04J 14/00; H04J 14/02; H04J 14/0267; H04J 14/0269; H04J 14/0273
 USPC ........... 398/45, 46, 47, 48, 49, 50, 51, 53, 54, 398/56, 57, 79, 58, 59; 370/235, 351, 389, 370/392, 474, 401
 See application file for complete search history.

(56) References Cited

U.S. PATENT DOCUMENTS

| | | | | |
|---|---|---|---|---|
| 6,839,322 B1 * | 1/2005 | Ashwood Smith | ........... | 370/235 |
| 7,415,207 B2 * | 8/2008 | Lanzone et al. | ................ | 398/46 |
| 7,711,007 B2 * | 5/2010 | Bleisteiner et al. | ........... | 370/490 |

\* cited by examiner

*Primary Examiner* — Hanh Phan

(57) ABSTRACT

A system having a first and second interfaces is described. At least one of the first and second interfaces has a cell engine, a first processor circuit, a second processor circuit, and a first and second transponder. The first processor circuit is coupled with the first transponder and the cell engine so as to transmit a header cell to the cell engine. The second processor circuit is coupled with the second transponder and the cell engine so as to transmit a body cell to the cell engine. The system may aggregate the processing capacity of several processor circuits to form larger capacity logical interfaces. Packets may be fragmented into a header cell including the packet header and body cells including the packet payload and then transmit and reassemble the packet. The header cells may be fully handled by the processor circuit, while body cells may be passed on without processing.

22 Claims, 5 Drawing Sheets

NETWORK INTERFACE AND METHOD OF AGGREGATING PROCESSOR CIRCUITS

FIELD OF THE INVENTIVE CONCEPTS

The inventive concepts disclosed herein generally relate to computer networks, and more particularly, but not by way of limitation, to a network interface and method of aggregating processor circuits.

BACKGROUND

Communication networks are well known in the art and function to transmit information such as computer data between various computer systems operably coupled to the information network. Generally there are two types of information networks—circuit switched and packet switched. Circuit switched networks operate by creating, maintaining and transmitting data over a circuit between two network nodes. This circuit typically has a fixed bandwidth which poses some disadvantages where the amount of data is large relative to the link's bandwidth, as it may take a long time for all of the data to be transmitted. Optical Transport Networks (which will be referred to as "OTN" or "OTNs" herein) are one example of circuit-switched networks.

Packet switched networks, may classify the original data into packets, which can be sent through the network via different communication links. Each of the packets is labeled, to allow the destination node to identify the packets.

Multiprotocol label switching (MPLS) is a packet switching technology which directs and carries data from one network node to the next node. The multiprotocol label switching mechanism assigns labels to data packets. Packet forwarding decisions from one node to the next node are made solely on the contents of the label for each data packet, without the need to examine the data packet further.

Generalized Multiprotocol Label Switching (GMPLS) is a type of protocol which extends MPLS to encompass circuit switching network schemes based upon time-division multiplexing (e.g. SONET/SDH, PDH, G.709), wavelength multiplexing, and spatial multiplexing (e.g. incoming port or fiber to outgoing port or fiber). Multiplexing, such as time-division multiplexing is when two or more distinct signals or data flows are transferred over the same link. In particular, time-division multiplexing (TDM) is a type of digital multiplexing in which two or more signals or data flows are transferred simultaneously at long time scale as sub-channels in one OTN communication link, but are physically taking turns on the communication link at very short time scales. The time domain is divided into several recurrent timeslots of fixed length, one for each sub-channel. After the last sub-channel, the cycle starts all over again. Time-division multiplexing is commonly used for OTN circuit mode communication with a fixed number of links and constant bandwidth per link. Time-division multiplexing differs from statistical multiplexing, such as packet switching, in that the timeslots are serviced in a fixed order and pre-allocated to the links.

One example of a packet-switched network for Local Area Networks (LAN or LANs) is defined by the IEEE 802 standards. These standards have found widespread acceptability and many LANs conform to these standards. A popular variation on one of the IEEE standards, IEEE Std. 802.3, 2000 Edition, is known as "Ethernet." Traditional Ethernet, as per the 802.3 standard, is a LAN utilizing a linear serial bus and uses a scheme for managing the LAN known as Carrier Sense Multiple Access with Collision Detection ("CSMA/CD"). CSMA/CD ensures that two computers transmitting at the same time detect collisions caused by simultaneous transmission, subsequently retransmit any packets which were corrupted by the simultaneous transmission during the previous transmission attempt.

Networks include nodes which have a plurality of interfaces configured to receive or transmit electrical or optical signals. A switch fabric and a controller work with the plurality of interfaces to route information such as packets through the node. Creating large capacity (e.g., 500 G or higher) interfaces capable of switching packets require controllers having packet processors of matching capacity. However, 500 G packet processors do not currently exist, and the bandwidth that is achievable by current optical components is faster than capacity of currently available packet processors.

Another way the prior art has attempted to overcome this problem is by using Equal Cost Multi-Path (ECMP) routing and Link Aggregation Group (LAG), whereby multiple parallel links carry entire packets that can be processed by independent network interfaces, but which require a load distributing stage (for instance deploying hashing of the header fields) that inherently is not 100% efficient and thus the aggregate has a lower effective bandwidth than the sum of components (depending on the traffic often very significantly).

Accordingly, a need exists in the prior art for network interfaces configured to enhance the capacity of network nodes. It is to such a network interface for a network node and to methods of aggregating forwarding capacity of processor circuits that the inventive concepts disclosed herein are directed.

SUMMARY

In one aspect the inventive concepts disclosed herein are directed to a system having a first interface, a second interface and a switch fabric. The first interface has a cell engine, a first processor circuit, a second processor circuit, a first transponder, and a second transponder. The first processor circuit is operably coupled with the first transponder and with the cell engine. The first processor circuit is configured to transmit the first cell to the cell engine. The second processor circuit is operably coupled with the second transponder and with the cell engine. The second processor circuit is configured to transmit the second cell to the cell engine. The cell engine is configured to assemble and reorder the first cell and the second cell into a packet, which is switched by the switch fabric to the second interface.

In another aspect, the inventive concepts disclosed herein are directed to an egress interface, comprising a cell engine configured to receive a packet having a packet header and a payload, segment the packet into a first cell including the packet header and a second cell including at least a portion of the payload of the packet, the first cell having a first header including routing information and the second cell having a second header. The cell engine is also configured to assign sequence numbers to the first cell and the second cell and store the sequence number in the first header and the second header. The ingress interface further comprises a first output circuit configured to be operably coupled with a first transmission path, a second output circuit configured to be operably coupled with a second transmission path, a first processor circuit operably coupled with the first output circuit and with the cell engine, and a second processor circuit operably coupled with the second output circuit and with the cell engine. The first processor circuit is configured to transmit the first cell to the first output circuit based on the first header, and the second processor circuit is configured to transmit the second cell to the second output circuit based on the second header. The first output circuit supplies a first optical signal carrying the first cell and the second output circuit supplies a second optical signal carrying the second cell.

In yet another aspect, the inventive concepts disclosed herein are directed to an ingress interface, comprising: a first input circuit configured to receive a first optical signal indicative of a first cell including a header of a packet from a first transmission path; a second input circuit configured to receive a second optical signal indicative of a second cell including at least a portion of a payload of the packet via a second transmission path and a first processor circuit operably coupled with the first input circuit and with a cell engine. The first processor circuit is configured to receive the first cell from the first input circuit, and transmit the first cell to the cell engine. The ingress interface also includes a second processor circuit operably coupled with the second input circuit and with the cell engine. The second processor circuit is configured to receive the second cell from the second input circuit, and transmit the second cell to the cell engine. The cell engine is configured to receive the first cell and the second cell, reorder them according to their sequence numbers and assemble the first cell and the second cell into the packet.

In a further aspect, the inventive concepts disclosed herein are directed to a system, comprising a first interface, including: (a) a first transponder configured to be operably coupled with a first transmission path; (b) a second transponder configured to be operably coupled with a second transmission path; (c) a cell engine configured to assemble a first cell and a second cell into a packet; (d) a first processor circuit operably coupled with the first transponder and with the cell engine, the first processor circuit configured to transmit the first cell to the cell engine; (e) a second processor circuit operably coupled with the second transponder and with the cell engine, the second processor circuit configured to transmit the second cell to the cell engine; (f) a first fabric interface operably coupled with the cell engine and configured to receive the packet from the cell engine; (g) a switch fabric operably coupled with the first fabric interface and configured to switch the packet. The system further comprises a second interface, including: (a) a second fabric interface operably coupled with the switch fabric and configured to receive the packet from the switch fabric; (b) a third transponder configured to be operably coupled with a third transmission path; and (c) a third processor circuit operably coupled with the third transponder and configured to transmit the packet received by the second fabric interface to the third transponder. The third transponder is configured to supply a first optical signal indicative of the packet over the third transmission path.

In yet another aspect, the inventive concepts disclosed herein are directed to a method, comprising (1) receiving, by an egress interface of a first node, a first packet having a header and a payload; (2) segmenting the first packet into a header cell containing the header, and a body cell containing at least a portion of the payload; (3) assigning sequence numbers to the header cell and the body cell; (4) transmitting the header cell to a first processor circuit operably coupled with a first output circuit and the body cell to a second processor circuit operably coupled with a second output circuit; (5) transmitting, by the first output circuit, a first optical signal carrying the header cell via a first transmission path over a network; and (6) transmitting, by the second output circuit, a second optical signal carrying the body cell via a second transmission path over the network.

BRIEF DESCRIPTION OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION

Figure 1:
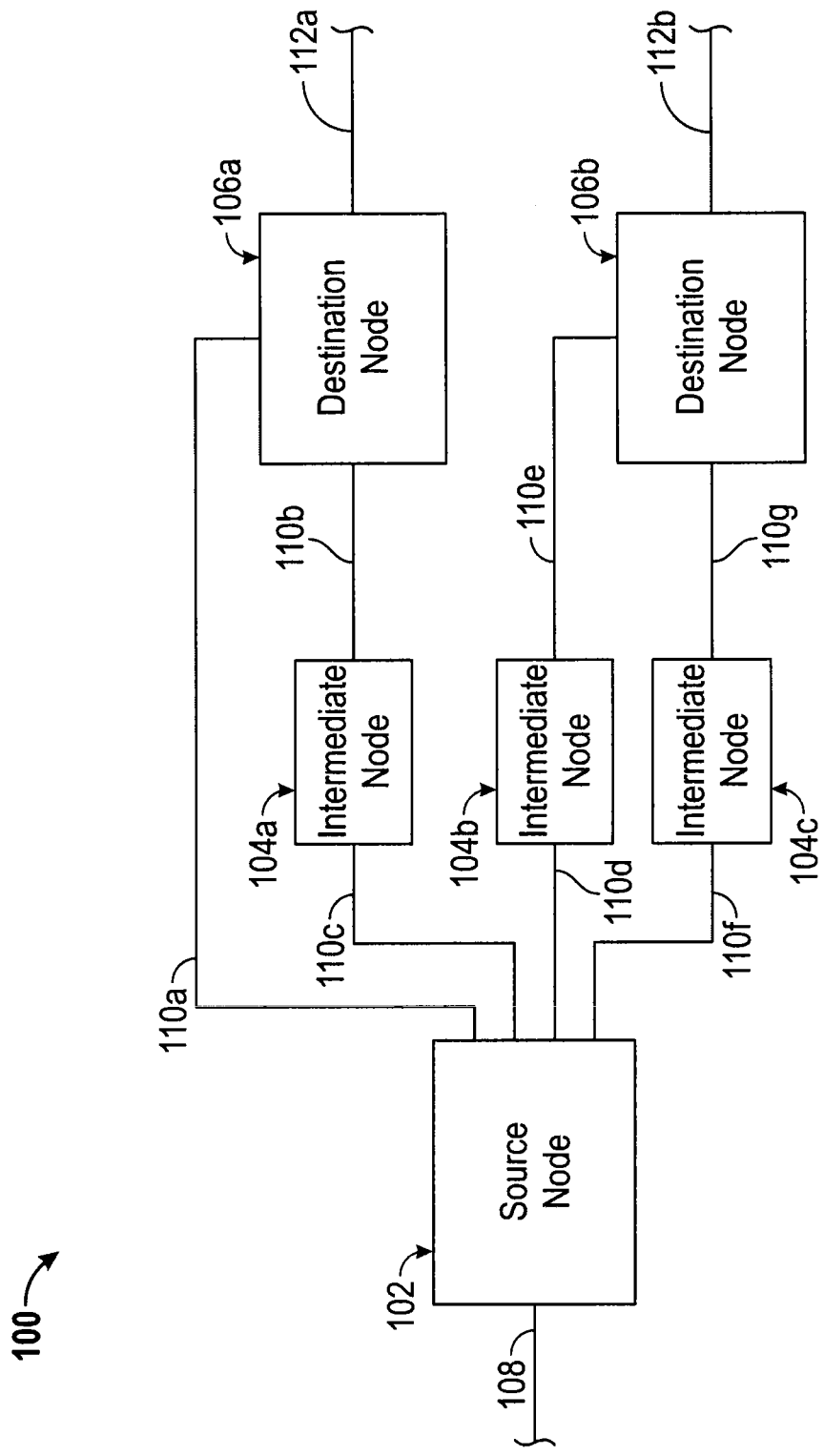
FIG. 1 is an exemplary embodiment of a network including a plurality of nodes according to the inventive concepts disclosed herein.

Before explaining at least one embodiment of the disclosure, it is to be understood that the disclosure is not limited in its application to the details of construction and the arrangement of the components or steps or methodologies set forth in the following description or illustrated in the drawings. Embodiments of the disclosure may be practiced or carried out in various ways. Also, it is to be understood that the phraseology and terminology employed herein is for the purpose of description and should not be regarded as limiting.

In the following detailed description of embodiments of the disclosure, numerous specific details are set forth in order to provide a more thorough understanding. However, it will be apparent to one of ordinary skill in the art that the embodiments may be practiced without these specific details. In other instances, well-known features have not been described in detail to avoid unnecessarily complicating the instant disclosure.

As used herein the notations "1-$n$" and "a-n" appended to a reference numeral or symbol are intended as merely convenient shorthand to reference one, or more than one, and up to infinity, of the element or feature identified by the respective reference numeral or symbol (e.g., 100a-n). Similarly, a letter following a reference numeral or symbol is intended to reference an embodiment of the feature or element that may be similar, but not necessarily identical, to a previously described element or feature bearing the same reference numeral (e.g., 100, 100a, 100b, $\lambda_1$). Such shorthand notations are used for purposes of clarity and convenience only, and should not be construed to limit the disclosure in any way, unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

As used herein the qualifiers "about," "approximately," and "substantially" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In addition, use of the "a" or "an" are employed to describe elements and components of the embodiments disclosed herein. This is done merely for convenience and to give a general sense of the embodiments. This description should be read to include one or more and the singular also includes the plural unless it is obvious that it is meant otherwise.

As used herein the terms "packet classification;" "classification," "classify," and variations thereof are intended to signify the processing or handling of a packet or a cell by a processor circuit at the expense of another packet or cell. The processing or handling of a packet or cell may include choosing a path or an exit cue for the packet or cell, deciding what path the packet or cell will take through a node or through a network, and also what kind of service the packet or cell will receive over that path.

Finally, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The inventive concepts disclosed herein are directed to network interfaces and nodes and to methods of aggregating processor circuits (which may be implemented by packet processors) of a network interface. In some exemplary embodiments, a node having a network interface according to the inventive concepts disclosed herein fragments packets into one or more cells having cell headers. The network interface may then assign sequence numbers to the cells, and include the sequence numbers in a cell header for each cell. The network interface may also mark the cell headers of each cell with a flag to classify each cell or to designate each cell as either a header cell (or a first type cell) or a body cell (or a second type cell). In one exemplary embodiment a header cell must be a cell that includes the header information of the packet, and may also include a portion of the payload of the packet, depending on packet size, for example. A body cell is a cell that includes only the payload of a packet, but not the header of the packet. A 1-bit flag may be used to designate a cell as a header cell or as a body cell, for example, but other methods of marking are also possible. The network interface then uses any desired load-balancing method to transmit the header and body cells to another network interface by distributing the cells over two or more separate processor circuits and/or corresponding parallel transport paths. A receiving network interface having two or more processor circuits may reassemble the cells into packets.

As will be appreciated by a person of ordinary skill in the art having the benefit of the instant disclosure, the inventive concepts disclosed herein allow multiple smaller bandwidth processor circuits and transport paths to be aggregated to create virtual higher-capacity packet switching single interfaces, for example.

In some exemplary embodiments, a network interface and method according to the inventive concepts disclosed herein may proceed through the following steps: (1) fragmentation of the packets having packet headers and packet payloads into cells, each cell having a cell header and a body; (2) assigning sequence numbers to the cells; (3) marking the cell headers to designate the cell as a header cell that contains fields used by processor circuits for classification, and a body cell that contain no such fields to be passed through processor circuits without classification; (4) distributing the resulting cells over multiple parallel transport paths that include processor circuit stages with the aforementioned two modes of classification; and (5) at the receiving end, gathering the cells arriving from multiple paths, reordering the cells based on the assigned sequence numbers, and reassembling the ordered cells back into packets. The cells that are designated as "header cells" may carry the classification data for the header cell and for all the subsequent "body cells" of that packet. In step 4, the cells may be distributed as uniformly or evenly as possible using load-balancing methods, such as round-robin load-balancing methodologies.

Fragmentation of the packets into cells can be carried out by a network interface according to the inventive concepts disclosed herein. In some exemplary embodiments a variable cell size in a range of between about 56 and about 256 bytes (including overheads) may be used. Such variable cell size may avoid small remnants at the end of the packet by averaging the length of the last two cells for a certain packet, for example. It is to be understood that in some exemplary embodiments of the inventive concepts disclosed herein, a single cell may include a packet fragment, or an entire packet of information.

Sequence numbers are part of a sequence number space in the cell header and may have a width or a size. Sequence numbers may be assigned to the header and body cells in any desired fashion, for example, similar to switch interface operation, except that the sequence number width may be greater to cover larger path delay skews and the need for multiple sequence number spaces (multiple separate counters) may be much reduced since there are far fewer destinations (typically just one although some exemplary embodiments may include up to ten or more counters, for example, to cover individual wavelengths).

To mark the cell headers to designate the cells as header cells and body cells, a 1-bit flag may be used. The processor circuits may look up the 1-bit flag to decide whether to do anything at all with the cell (e.g., classify the cell or simply pass the cell along).

Assuming that the cells are smaller than the packets used to create the cells, aggregating processor circuits and parallel transport paths according to the inventive concepts disclosed herein may be more bandwidth efficient than traditional alternative Link Aggregation Group (LAG) of lower rate interfaces, due to limited methods of load distribution that do not require reordering. This leads to potentially large bandwidth savings due to load distribution efficiency.

Referring now to the drawings and in particular to FIG. 1, shown therein is an exemplary embodiment of a network 100 comprising a source node 102, an intermediate node 104, and a destination node 106. Only one source node 102, three intermediate nodes 104, and two destination nodes 106 are shown for purposes of clarity, however, it should be understood that the network 100 can have any number of source nodes 102, intermediate nodes 104, and destination nodes 106. The intermediate nodes 104 are labeled 104a, 104b, and 104c for purposes of clarity. The destination nodes are labeled 106a and 106b for purposes of clarity.

The source node 102 is configured to receive data via one or more paths 108, only one being shown in FIG. 1 for purposes of clarity. The path 108 may be implemented as a physical communication link, such as an optical fiber, electrical cable, wireless transmission, and combinations thereof, or may be implemented as one or more logical transmission paths over a single or multiple physical links, for example. Data received by the source node 102 via the path 108 may be provided from one or more of a processor, a computer, a server, a data center, a network, and/or a network node, and combinations thereof, for example. High-speed packet flows comprising a plurality of packets including bytes may enter the network 100 at the source node 102 via the path 108, and may be transmitted to the destination nodes 106a or 106b through the intermediate nodes 104a-c, or directly between the source node 102 and the destination node 106a, via one or more parallel transmission paths 110a-g, for example. The parallel transmission paths 110a-g can be implemented as physical communication links, such as an optical fiber, electrical cable, wireless transmission, and combinations thereof, or may be implemented as logical transmission paths over a single or multiple physical links, for example. Data may leave the destination nodes 106a-b via paths 112a-b, for example. The paths 112a-b may be implemented as a physical communication link, such as an optical fiber, electrical cable, wireless transmission, and combinations thereof, or may be implemented as a logical transmission path over a single or multiple physical links, for example The intermediate nodes 104a-c may be configured to forward data between the source node 102 and the destination node 106a-b. For example, data can be transmitted from the source node 102 to the destination node 106a via the intermediate node 104a. Data may also travel through two or more intermediate nodes 104b-c prior to reaching the destination node 106b. Further, data may go directly from the source node 102 to the destination node 106a via the parallel transmission path 110a, without passing through the intermediate nodes 104a-c, for example.

It is to be understood that the intermediate nodes 104a-c may have a structure similar or substantially identical to the structure of the source node 102 as will be described below. It is to be further understood that a single node may operate as the source node 102, the intermediate nodes 104a-c, and the destination nodes 106a-b, desirably at the same time, for example, depending on the direction and destination of data flows. For example, in some embodiments the destination nodes 106a-b can be similar and/or substantially identical in structure to the source node 102 and/or the intermediate nodes 104a-c. Such configuration allows the network 100 to handle data traffic in both directions, preferably at the same time, by providing the source node 102 that can function as the destination nodes 106a-b, or as the intermediate nodes 104a-c, the destination nodes 106a-b that may function as the source node 102 or as the intermediate nodes 104a-c, and/or the intermediate node 104a-c that may function as the source node 102 or as the destination nodes 106a-b, or combinations thereof, for example.

Figure 2:
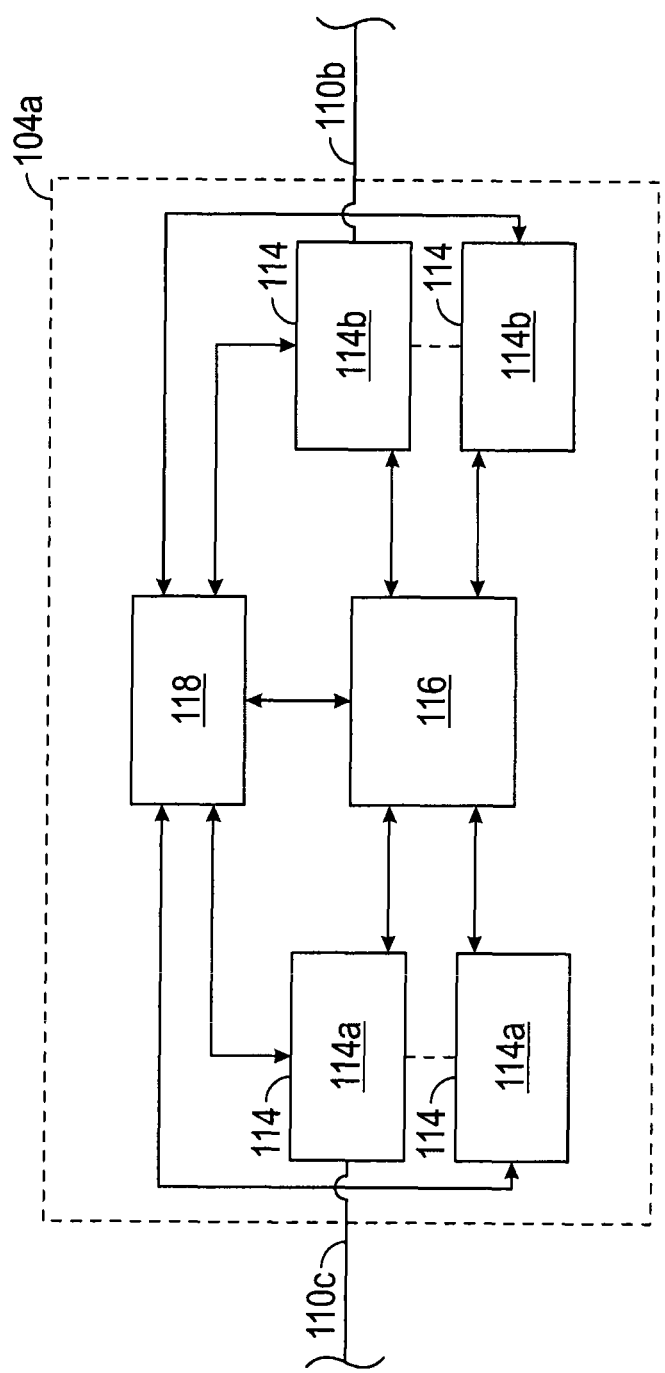
FIG. 2 is a diagram of an exemplary embodiment of a node including exemplary embodiments of a network interface according to the inventive concepts disclosed herein.

Referring now to FIG. 2, shown therein is an exemplary embodiment of the node 104a constructed in accordance with the inventive concepts disclosed herein. As will be discussed in more detail below, the node 104a is adapted to facilitate the communication of data (which may be referred to herein as "traffic") between two or more nodes 102 or 106a-b in the network 100.

The node 104a may include a plurality of network interfaces 114, which will be described herein as one or more ingress interfaces 114a and one or more egress interfaces 114b. The node 104a may also include a switch fabric 116, and a control module 118.

In general, the ingress interfaces 114a may be configured to receive data or traffic from the network 100 via the path 110, and the egress interfaces 114b may be configured to transmit data or traffic onto the network 100 (e.g., via the parallel transmission paths 110a-g, for example). It is to be understood that while two ingress interfaces 114a and two egress interfaces 114b are shown in FIG. 2, the node 104a may be implemented with any desired number of ingress interfaces 114a and egress interfaces 114b, such as two, three, five, six, seven, eight, nine, ten, or more than ten ingress interfaces 114a and/or egress interfaces 114b, for example.

The switch fabric 116 is operably coupled with the ingress interfaces 114a and with the egress interfaces 114b and serves to switch or communicate data or traffic between the ingress interfaces 114a and the egress interfaces 114b.

The control module 118 is operably coupled with the ingress interfaces 114a, the egress interfaces 114b, and with the switch fabric 116, and serves to control the operations of the ingress interfaces 114a, the egress interfaces 114b, and the switch fabric 116, for example. The control module 118 may include a processor executing processor executable code, such as a network processing unit, for example.

The node 104a can be implemented in a variety of ways, including, commercial installations having one or more backplanes (not shown), racks, and the like. In this example, the ingress interfaces 114a, the egress interfaces 114b, the switch fabric 116, and the control module 118 are implemented as separate devices, which may have their own power supply, local memory, and processing equipment. In another example, the node 104a can be implemented as a single device having a shared power supply, memory and processing equipment. Or, in another example, the node 104a can be implemented in a modular manner in which one or more of the ingress interfaces 114a, the egress interfaces 114b, the switch fabric 116, and the control module 118 share a power supply and/or a housing (not shown).

The egress interfaces 114b of the node 104a may be configured to communicate with the ingress interfaces 114a of another node within the network 100 via parallel transmission paths 110a-g, for example. An example of an ingress interface 114a and/or an egress interface 114b is an Ethernet card or optical port. In general, the ingress interface 114a and the egress interface 114b may have a unique logical identification, such as an IP address, for example.

The implementation of the ingress interfaces 114a and of the egress interfaces 114b may depend upon the particular type of parallel transmission paths 110a-g that the particular ingress interfaces 114a and/or egress interfaces 114b are configured to communicate with. For example, the ingress interfaces 114a can be designed to communicate wirelessly with another node within the network 100, while the egress interfaces 114b can be designed to communicate optically or electrically through a fiber-optic link or a wire link with the source node 102 and/or the destination node 106a-b within the network 100, and vice versa. For the node 104a, the ingress interfaces 114a and the egress interfaces 114b may be substantially identical to one another, for example.

The ingress interfaces 114a and the egress interfaces 114b are shown and referenced separately for purposes of clarity. However, it should be understood that the ingress interfaces 114a may function as the egress interfaces 114b, and the egress interfaces 114b may function as the ingress interfaces 114a, depending on the direction of the flow of data through the network interfaces 114, for example.

Figure 3:
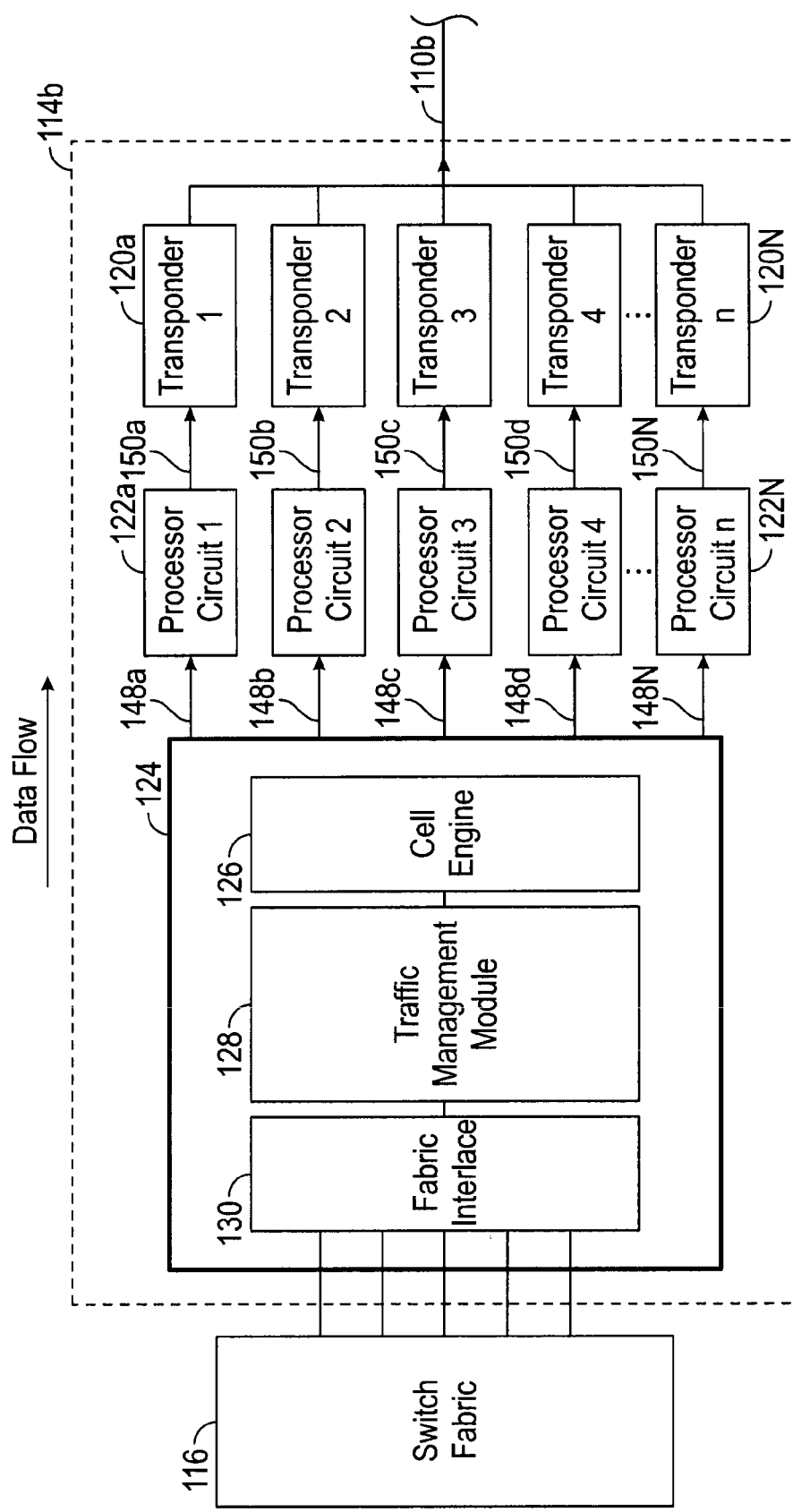
FIG. 3 is a diagram of an exemplary embodiment of a network interface according to the inventive concepts disclosed herein functioning as an egress interface.

Referring now to FIG. 3, shown therein is an exemplary embodiment of the egress interface 114b according to the inventive concepts disclosed herein. The egress interface 114*b* may include two or more transponders 120*a-n*, two or more processor circuits 122*a-n*, a module 124 including a cell engine 126, a traffic management module 128, and a fabric interface 130, for example. The egress interface 114*b* may be operably coupled with the switch fabric 116 as described above, for example.

Figure 5:
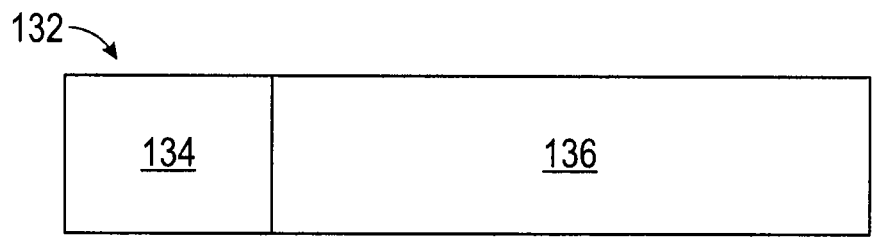
FIG. 5 is a diagram of a packet according to the inventive concepts disclosed herein.

The fabric interface 130 may be configured to interface with the switch fabric 116 via any desired interconnect protocol (e.g., Ethernet or Interlaken), so that data indicative of one or more packets 132 as shown in FIG. 5 having a packet header 134 and a payload 136 may be received by the fabric interface 130 from the switch fabric 116, for example. The data may include one or more bits or bytes, as will be understood by a person of ordinary skill in the art. The fabric interface 130 may be configured to reassemble the data into the packet 132 having the packet header 134 and the payload 136, and to provide the packet 132 to the traffic management module 128 for queuing and scheduling, for example.

The traffic management module 128 may be configured to receive the packet 132 from the fabric interface 130. The traffic management module 128 schedules packets, such as the packet 132, for transmission over the processor circuits 122*a-n* in a manner to manage congestion of packets 132 passing through the egress interface 114*b*, for example.

The cell engine 126 may be configured to receive the packet 132 from the traffic management module 128 and to segment the packet 132 into one or more cells including first type of cell referred to as a header cell 138 and one or more second type of cell referred to as a body cell 139 (hereinafter "body cell 139"). The cell engine 126 may be implemented in a variety of manners, such as an Application Specific Integrated Circuit (ASIC), Field Programmable Gate Array (FPGA) or a processor circuit that has been programmed with software stored in variety of forms and media (such as but not limited to ROM, NVRAM, flash).

Figure 6:
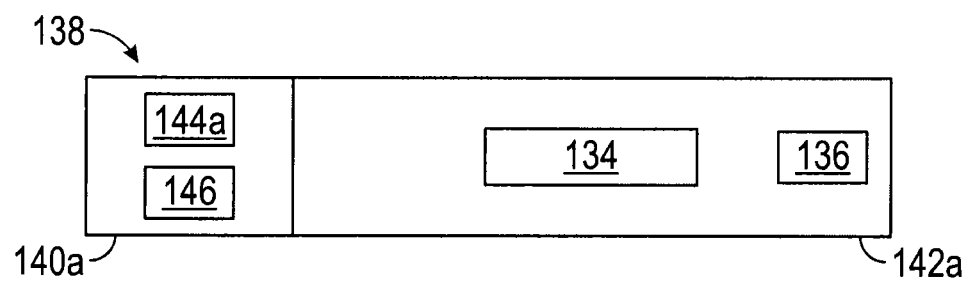
FIG. 6 is a diagram of a header cell according to the inventive concepts disclosed herein.
Figure 7:
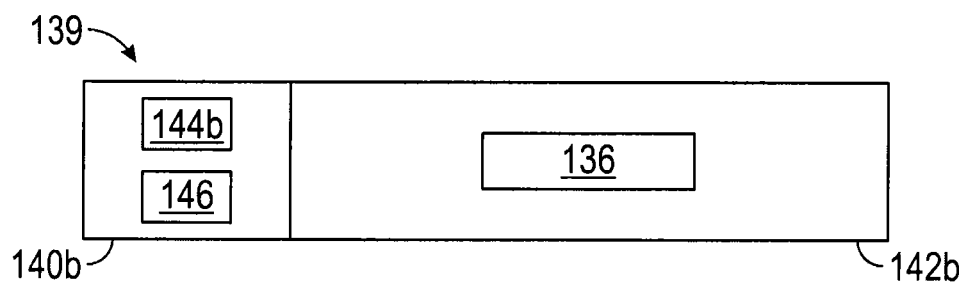
FIG. 7 is a diagram of a body cell according to the inventive concepts disclosed herein.

The header cell 138 has a cell header 140*a* and a body 142*a*. The body cell 139 has a cell header 140*b* and a body 142*b* as shown in FIGS. 6-7. The body 142*a* of the header cell 138 and must include the packet header 134 in its entirety, and optionally a portion of the payload 136 depending on the size of the header cell 138 and the packet 132, for example. Depending on the size of the packet 132, the cell engine 126 may further segment the packet 132 into one or more body cells 139 including the payload 136 of the packet 132. For example, the packet 132 may be segmented into a single header cell 138, the packet 132 may be segmented into a header cell 138 and a body cell 139, or the packet 132 may be segmented into a header cell 138 and two or more, or a plurality of body cells 139*a-n*, depending on the size of the packet 132 and the size of the cells 138 and 139.

In one exemplary embodiment, the header cell 138 and the body cells 139 may have the same size (e.g., 256 bytes), while in some exemplary embodiments the header cell 138 and the body cells 139 may have different sizes. Further, in some embodiments, to avoid small remnants at the end of the packet 132, the length of the last two cells 138 and/or 139 into which the packet 132 is segmented may be averaged, as will be appreciated by a person of ordinary skill in the art.

The cell header 140*a* of the header cell 138 may include routing and classification information from the packet header 134, a sequence number 144*a*, and other information including a flag 146 distinguishing the header cell 138 from the body cells 139. Similarly, the cell headers 140*b* of the body cells 139 may include routing information from the packet 132, a sequence number 144*b* (e.g., higher than the sequence number of the header cell) and the flag 146 distinguishing the body cells 139 from the header cell 138. The body 142*b* of the body cells 139 may include a portion of the payload 136 of the packet 132. The cell engine 126 may utilize one or more counters to assign the sequence numbers 144*a* and 144*b* to the header cell 138 and to the body cells 139. The sequence numbers 144*a* and 144*b* assigned to the header cell 138 and to the body cells 139 may be assigned similarly to the fabric interface 130, for example, except that the width of the assigned sequence numbers 144*a* and 144*b* may be greater to cover bigger path delay skews.

The cell engine 126 may be operably coupled with the processor circuits 122*a-n* via lines 148*a-n*. The cell engine 126 may distribute the header cell 138 and the body cells 139 over the processor circuits 122*a-n* by distributing the header cell 138 to a first processor circuit 122*a* via a line 148*a*, and distributing a first body cell 139 to a second processor circuit 122*b* via a line 148*b*, a second body cell 139 to a third processor circuit 122*c* via a line 148*c*, and so on. As an example, supposing that the packet 132 has been segmented by the cell engine 126 into the header cell 138 and four body cells 139*a-d* and that the egress interface 114*b* includes five processor circuits 122*a-e*, the header cell 138 may be provided to the processor circuit 122*a* via line 148*a*, the body cell 139*a* may be provided to the processor circuit 122*b* via line 148*b*, the body cell 139*b* may be provided to the processor circuit 122*c* via line 148*c*, the body cell 139*c* may be provided to the processor circuit 122*d* via line 148*d*, and the body cell 139*d* may be provided to the processor circuit 122*e* via line 148*e*.

As another example, suppose that the packet 132 has been segmented by the cell engine 126 into six cells including the header cell 138 and five body cells 139*a-e*, and the egress interface 114*b* includes five processor circuits 122*a-e*. In this example the header cell 138 and the first four body cells 139*a-d* will be distributed to the processor circuits 122*a-n* as described above. The body cell 139*e* may be distributed to the processor circuit 122*a* via line 148*a*, for example. As will be appreciated by a person of ordinary skill in the art, when the number of header cells 138 and body cells 139 exceeds the number of processor circuits 122*a-n*, the header cell 138 and the body cells 139 may be distributed by the cell engine 126 to the processor circuits 122*a-n* using any desired load-balancing method or algorithm (e.g., round-robin, or any suitable load-balancing scheduling algorithm) starting with the header cell 138 and continuing in a round-robin or any other suitable fashion until the header cell 138 and all body cells 139 have been distributed substantially evenly to the processor circuits 122*a-n*, for example. The load-balancing method and algorithm used with the inventive concepts disclosed herein may vary, and any desired load-balancing method or algorithm may be implemented, provided that the load-balancing method and/or algorithm distributes the header cell 138 and the body cells 139 substantially evenly over the processor circuits 122*a-n*, for example.

The processor circuits 122*a-n* may receive the header cell 138 and the body cells 139 from the cell engine 126. The processor circuits 122*a-n* may look up the flag 146 identifying the cell as the header cell 138 or the body cell 139 to determine whether to do anything at all with the particular cell 138 or 139. The processor circuits 122*a-n* may process and transmit the header cell 138 and may simply transmit the body cells 139 to the transponders 120*a-n* based on the flag 146 of each cell 138 or 139, for example, for transmission of the header cell 138 and the body cells 139 over the parallel transmission paths 110*a-g*.

The processor circuits 122*a-n* may be implemented as any suitable device, including one or more processor, a network processing unit, a circuit, software, firmware, and combinations thereof, for example. For example, the processor circuits 122a-n may be implemented as a single processor or multiple processors working together to execute the logic described herein. Exemplary embodiments of the processor may include a digital signal processor (DSP), a central processing unit (CPU), a field programmable gate array (FPGA), a microprocessor, a multi-core processor, and combinations thereof. The processor circuits 122a-n may be controlled by the control module 118, for example. The processor circuits 122a-n may be configured to process or classify one or more packets 132 or cells 138 or 139, such as via accessing and/or modifying the packet header 134 of a packet 132 or the cell header 140a or 140b of a cells 138 or 139 to determine the path a packet 132 or a cell 138 or 139 is to take through the network 100 and/or to determine a quality of service to be given to the packet 132 or the cells 138 or 139, for example.

Each of the transponders 120a-n may be operably coupled with the processor circuits 122a-n via paths 150a-n. For example, the transponder 120a may receive the header cell 138 from the processor circuit 122a, the transponder 120b may receive the body cell 139a from processor circuit 122b, and the transponder 120c may receive the body cell 139b from the processor circuit 122c, and so on until all body cells 139 have been received by the transponders 120a-n.

In some exemplary embodiments one of the processor circuits 122a-n may be configured to process, classify, or transmit the header cell 138 but not the body cell 139, and another one or more of the processor circuits 122a-n may be configured to process, classify, or transmit the body cell 139 but not the header cell 138. As will be appreciated by persons of ordinary skill in the art, the cell engine 126 may account for such configuration of the processor circuits 122a-n, by distributing the header cell 138 to the processor circuit(s) 122a-n configured to process the header cell 138, and by distributing the body cell(s) 139 to the processor circuit(s) 122a-n configured to process the body cell 139, for example. In some exemplary embodiments, all of the processor circuits 122a-n may be configured to process both the header cell 138 and the body cell 139, and the cell engine 126 may be configured to distribute the header cell 138 and the body cells 139 to the processor circuits 122a-n in any desired load balancing manner.

The transponders 120a-n may be implemented as any desired device having an input circuit and an output circuit configured to be operably coupled with a transmission path. For example, the transponders 120a-n may be implemented as an optical-electrical device, an electrical-optical device, an optical-electrical-optical device, an electrical-optical-electrical device, and combinations thereof, configured to transmit and/or receive the packet 132 or the cells 138 or 139 over a network, such as the network 100. The transponders 120a-n may be configured to transmit one or more signals indicative of the packet 132 or of the cells 138 or 139 to the parallel transmission paths 110a-g via paths 134a-n, and/or to receive one or more signals indicative of the packet 132 or of the cells 138 or 139 from the parallel transmission paths 110a-g via paths 134a-n, for example. In some exemplary embodiments the transponders 120a-n may include a processor configured to filter out noise, amplify, and/or to otherwise process signals received by the transponders 120a-n and/or signals transmitted by the transponders 120a-n.

The transponders 120a-n may transmit each of the header cell 138 and the body cells 139 over the network 100 over the parallel transmission paths 110a-g. As will be appreciated by a person of ordinary skill in the art, the parallel transmission paths 110a-g may include parallel physical links, or may include one or more physical link including multiple channels, such as parallel transmission paths 110a-n defined by wave division multiplexing or time division multiplexing, for example. In an exemplary embodiment, the parallel transmission paths 110a-g may be operably coupled with a photonic integrated chip (not shown), which may convert the signals carried by the parallel transmission paths 110a-n into an optical signal including multiple wavelengths, which optical signal may be carried through the network 100 on two or more paths 108, 110, or 112 (e.g., optical fibers), or on a single path 108, 110, or 112 (e.g., a single optical fiber via wave division multiplexing or time division multiplexing).

In the exemplary embodiment shown in FIG. 3, five transponders 120a-n are shown as communicating with five parallel transmission paths, but it is to be understood that the inventive concepts disclosed herein may be implemented with any desired number of transponders 120a-n and parallel transmission paths, such as one, two, three, four, six, and more than six, for example. Further, it is to be understood that while five transponders 120a-n and five processor circuits 122a-n are shown in FIG. 3, the inventive concepts disclosed herein may be implemented with any number of processor circuits 122a-n, transponders 120a-n, and parallel transmission paths 110a-g, such as two, three, four, six, seven, eight, nine, ten, 100, 1000, or more than 1000, and combinations thereof, for example. The egress interface 114b may also be provided with a multiplexer (not shown) for multiplexing the parallel transmission paths onto a single physical link, such as a fiber optic cable. However, it should be understood that the multiplexer can be omitted such that the parallel transmission paths are directed onto separate physical links.

Figure 4:
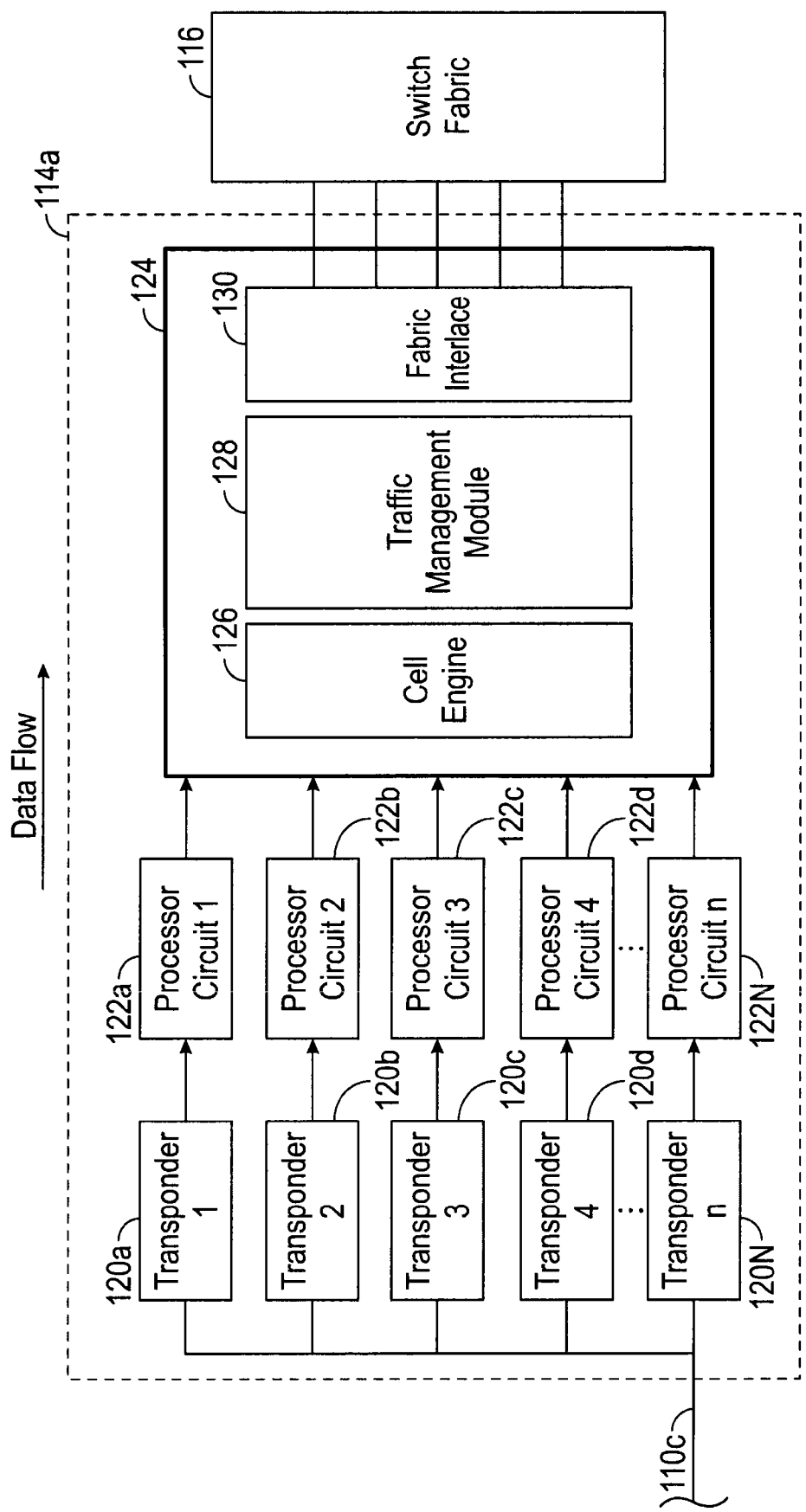
FIG. 4 is a diagram of the network interface of FIG. 3, functioning as an ingress interface.

Referring now to FIG. 4, shown therein is an embodiment of an ingress interface 114a according to the inventive concepts disclosed herein. The ingress interface 114a may be implemented and may function similarly to the egress interface 114b, for example as described above. In some exemplary embodiments, the ingress interface 114a and the egress interface 114b may be substantially identical and may be interchangeable with one another. The network interface 114, when functioning as the ingress interface 114a may include two or more transponders 120a-n, two or more processor circuits 122a-n, the module 124 including the cell engine 126, the traffic management module 128, and the fabric interface 130, for example. The ingress interface 114a may be operably coupled with the switch fabric 116 as described above, for example.

The transponders 120a-n may be operably coupled with the parallel paths 110c of the network 100, for example, so that the transponders 120a may receive one or more signals over the parallel transmission paths 110c. As discussed above, the ingress interface 114a can be provided with a multiplexer connected to a single physical link for directing one of the parallel paths 110c to each transponder 120a-n. For example, the transponder 120a may receive a signal indicative of the header cell 138 transmitted by the transponder 120a of the egress interface 114b over the parallel transmission path 110a, the transponder 120b may receive a signal indicative of the body cell 139 transmitted by the transponder 120b of the egress interface 114b over the parallel paths 110c, and so on, until the transponders 120a-n have received the header cell 138 and all body cells 139 (if any) for the packet 132 transmitted by the egress interface 114b. The transponders 120a-n may then pass the header cell 138 and the body cells 139 on to the corresponding processor circuits 122a-n.

The processor circuits 122a-n may receive the header cell 138 and the body cells 139 from the transponders 120a-n. Each of the processor circuits 122a-n may then look at the flag 146 of each received cell to determine if the cell is a header cell 138 or a body cell 139, thus deciding whether to do anything at all with the particular cell. For example, supposing that the processor circuit 122*a* receives the header cell 138 and that the processor circuits 122*b-n* receive body cells 139, the processor circuit 122*a* may recognize the header cell 138 and may classify the header cell 138 according to the information contained in the header 146*a* of the header cell 138 and/or in the packet header 134 included in the body 142*a* of the header cell 138. The body cells 139 may not be classified by the processor circuits 122*b-n*, and may simply be passed along by the processor circuits 122*b-n* to the cell engine 126.

The cell engine 126 may receive the header cell 138 and the body cells 139 from the processor circuits 122*a-n*, and may reassemble the header cell 138 and the body cells 139 into the packet 132, based on the sequence numbers 144*a* and 144*b* of the cells 138 and 139, for example. As described above, the header cell 138 may have a lower sequence number 144*a* than the sequence numbers 144*b* of the body cells 139, and the cell engine 126 may reassemble the cells 138 and 139 into the packet 132 by sequence number 144*a* and 144*b* and may track potential holes in the sequence numbers of incoming cells, for example. Cells that are received out of order may be reordered by the cell engine 126 to reassemble the packet 132, as will be appreciated by persons of ordinary skill in the art. The packet 132 may be passed on to the traffic management module 128, which may schedule the packet 132 for transmission over the switch fabric 116 via the fabric interface 130. The fabric interface 130 may then segment the packet 132 and distribute the packet 132 over the switch fabric 116, for example.

The operation of the cell engine 126 of the ingress interface 114*a* may be similar to the operation of a segmentation-and-reassembly based interface (e.g., Asynchronous Transfer Mode), for example.

In operation, the source node 102 according to an exemplary embodiments of the inventive concepts disclosed herein may operate as follows. A packet 132 having the packet header 134 and the payload 136 may be received by the node 104. The packet 132 may be processed by the node 104 and passed to the egress interface 114*b* of the intermediate node 104. The egress interface 114*b* may segment the packet 132 into a header cell 138 and one or more body cells 139 as described above, and may transmit the header cell 138 and the body cells 139 via the two or more processor circuits 122*a-n* and transponders 120*a-n* via the parallel transmission paths 110*a-g* over the network 100 to another node 102, 104 and/or 106, for example.

If the header cell 138 and the body cells 139 are transmitted to an intermediate node 104, the network interface 114 of the intermediate node 104 functioning as the ingress interface 114*a* may reassemble the header cell 138 and the body cells 139 into the packet 132 and direct the packet 132 to another network interface 114 functioning as the egress interface 114*b* via the switch fabric 116. The cell engine 126 of the egress interface 114*b* segments the packet 132 into the header cell 138 and the body cells 139, and may transmit the header cell 138 and the body cells 139 to the destination node 106 as described above, for example. Multiple intermediate nodes 104 may process and/or transmit the header cell 138 and the body cells 139 as described above over the network 100, for example.

If the header cell 138 and the body cells 139 are transmitted to the destination node 106, the destination node 106 may process the header cell 138 and/or the body cells 139 through the ingress interface 114*a*, reassemble the packet 132, and transmit the packet 132 to the network 100 or to another node, for example, by using a conventional packet-switching egress interface and/or the egress interface 114*b*.

As will be appreciated by a person of ordinary skill in the art, aggregating multiple processor circuits 122*a-n* and transponders 120*a-n* according to the inventive concepts disclosed herein allows the nodes 102, 104, and 106 to create a virtual higher capacity packet switching interface. In some exemplary embodiments, the virtual higher capacity packet switching interface may have a capacity of about 500 Gigabits, or higher.

The disadvantages of the prior art are overcome by using effective load balancing algorithms to distribute the header cell 138 and the body cells 139 substantially evenly over the available processor circuits 122*a-n*, transponders 120*a-n* and paths 110, for example.

It is to be understood that the steps disclosed herein may be performed simultaneously or in any desired order, and may be carried out by a computer system, for example. For example, one or more of the steps disclosed herein may be omitted, one or more steps may be further divided in one or more sub-steps, and two or more steps or sub-steps may be combined in a single step, for example. Further, in some exemplary embodiments, one or more steps may be repeated one or more times, whether such repetition is carried out sequentially or interspersed by other steps or sub-steps. Additionally, one or more other steps or sub-steps may be carried out before, after, or between the steps disclosed herein, for example.

Although the embodiments disclosed herein have been described in some detail by way of illustration and example for purposes of clarity of understanding, it will be apparent to those skilled in the art that certain changes and modifications may be practiced without departing from the spirit and scope of the embodiments disclosed herein. As such, those skilled in the art will appreciate that the conception upon which this disclosure is based may readily be utilized as a basis for the designing of other structures, methods, and systems for phase conjugating an input light signal. As such, it should be understood that the embodiments disclosed herein are not limited to the specific embodiments described herein, including the details of construction and the arrangements of the components as set forth in the above description or illustrated in the drawings. Further, it should be understood that the phraseology and terminology employed herein are for the purpose of description and should not be regarded as limiting.

As it will be appreciated by persons of ordinary skill in the art, changes may be made in the construction and the operation of the various components, elements and assemblies described herein or in the steps or the sequence of steps of the methods described herein without departing from the broad scope of the embodiments disclosed herein.

From the above description, it is clear that the embodiments disclosed herein are well configured to carry out the objects and to attain the advantages mentioned herein as well as those inherent advantages. While presently preferred embodiments have been described for purposes of this disclosure, it will be understood that numerous changes may be made which will readily suggest themselves to those skilled in the art and which are accomplished within the scope and coverage disclosed and claimed herein.

What is claimed is:

1. An egress interface, comprising:
   a cell engine configured to receive a packet having a packet header and a payload, segment the packet into a first cell including the packet header and a second cell including at least a portion of the payload of the packet, the first cell having a first header including routing information and the second cell having a second header, assign sequence numbers to the first cell and the second cell, such that the the first and second cells include first and second sequence numbers, respectively, the first and second sequence numbers indicating an ordering of the packet header and said at least the portion of the payload in the packet, respectively;
a first output circuit configured to be operably coupled with a first transmission path;
a second output circuit configured to be operably coupled with a second transmission path;
a first processor circuit operably coupled with the first output circuit and with the cell engine;
a second processor circuit operably coupled with the second output circuit and with the cell engine; and
wherein the first processor circuit is configured to transmit the first cell to the first output circuit based on the first header, and the second processor circuit is configured to transmit the second cell to the second output circuit based on the second header, the first output circuit supplying a first optical signal carrying the first cell and the second output circuit supplying a second optical signal carrying the second cell.

2. The egress interface of claim 1, wherein the first optical signal and the second optical signal are not multiplexed.

3. The egress interface of claim 1, wherein the first optical signal and the second optical signal are multiplexed.

4. The egress interface of claim 1, further comprising a traffic management module operably coupled with the cell engine, the traffic management module configured to receive the packet, queue the packet, and transmit the packet to the cell engine.

5. The egress interface of claim 1, wherein the cell engine includes an application specific integrated circuit.

6. The egress interface of claim 1, further comprising a switch fabric supplying a plurality of bytes identifying the packet.

7. The egress interface of claim 6, further comprising a fabric interface configured to receive a plurality of bytes from a switch fabric and output a packet, the plurality of bytes identifying the packet, the packet having a packet header and a payload, the packet including the plurality of bytes.

8. The egress interface of claim 1, wherein the cell engine designates the first cell as a first type cell, and the second cell as a second type cell.

9. The egress interface of claim 8, wherein the first processor circuit is configured to transmit the first type cell but not the second type cell, and wherein the second processor circuit is configured to transmit the second type cell but not the first type cell.

10. The egress interface of claim 8, wherein the first and second processor circuits are configured to process the first and second type cells.

11. An ingress interface, comprising:
a first input circuit configured to receive a first optical signal indicative of a first cell including a header of a packet from a first transmission path, the first cell including a first sequence number indicative of an ordering of the header in the packet;
a second input circuit configured to receive a second optical signal indicative of a second cell including at least a portion of a payload of the packet via a second transmission path, the second cell including a second sequence number indicative of an ordering of said at least the portion of the payload in the packet;
a first processor circuit operably coupled with the first input circuit and with a cell engine, the first processor circuit configured to receive the first cell from the first input circuit, and transmit the first cell to the cell engine;
a second processor circuit operably coupled with the second input circuit and with the cell engine, the second processor circuit configured to receive the second cell from the second input circuit, and transmit the second cell to the cell engine; and
a cell engine configured to receive the first cell and the second cell, and assemble the packet based on the first and second sequence numbers.

12. The ingress interface of claim 11, further comprising a fabric interface operably coupled with the cell engine and configured to receive the packet from the cell engine and to transmit the packet in a format configured to be switched by a switch fabric.

13. The ingress interface of claim 11, further comprising a traffic management module operably coupled with the cell engine, the traffic management module configured to receive the packet from the cell engine and queue the packet.

14. The ingress interface of claim 11, wherein the first processor circuit is configured to classify the first cell if the first cell is designated as a header cell.

15. The ingress interface of claim 11, wherein the first processor circuit is configured to classify the first cell designated as a header cell based at least in part on information from the header of the packet.

16. The ingress interface of claim 11, wherein the cell engine includes an application specific integrated circuit.

17. A system, comprising:
a first interface, comprising:
a first transponder configured to be operably coupled with a first transmission path;
a second transponder configured to be operably coupled with a second transmission path;
a cell engine configured to receive a first cell and a second cell, the first cell including a first sequence number indicating an ordering of first data in a packet, and the second cell including a second sequence number indicating an ordering of second data in the packet, the cell engine assembling the first cell and second cell into the packet based on the first and second sequence numbers;
a first processor circuit operably coupled with the first transponder and with the cell engine, the first processor circuit configured to transmit the first cell to the cell engine;
a second processor circuit operably coupled with the second transponder and with the cell engine, the second processor circuit configured to transmit the second cell to the cell engine;
a first fabric interface operably coupled with the cell engine and configured to receive the packet from the cell engine;
a switch fabric operably coupled with the first fabric interface and configured to switch the packet;
a second interface, comprising:
a second fabric interface operably coupled with the switch fabric and configured to receive the packet from the switch fabric;
a third transponder configured to be operably coupled with a third transmission path;
a third processor circuit operably coupled with the third transponder and configured to transmit the packet received by the second fabric interface to the third transponder; and
wherein the third transponder is configured to supply a first optical signal indicative of the packet over the third transmission path.

18. The system of claim 17, further comprising a traffic management module operably coupled with the cell engine and the first fabric interface, the traffic management module configured to manage a flow of one or more packets through the first interface.

19. The system of claim 17, wherein the cell engine includes an application specific integrated circuit.

20. A method, comprising:

receiving, by an egress interface of a first node, a first packet having a header and a payload;

segmenting the first packet into a header cell containing the header, and a body cell containing at least a portion of the payload;

assigning a first sequence to the header cell and a second sequence number to the body cell, the first sequence number indicating an ordering of the header in the packet and the second sequence number indicating an ordering of said at least the portion of the payload in the packet;

transmitting the header cell to a first processor circuit operably coupled with a first output circuit and the body cell to a second processor circuit operably coupled with a second output circuit;

transmitting, by the first output circuit, a first optical signal carrying the header cell via a first transmission path over a network; and transmitting, by the second output circuit, a second optical signal carrying the body cell via a second transmission path over the network.

21. The method of claim 20, further comprising:

receiving the first optical signal over the first transmission path by an ingress interface, the ingress interface being a component of a second node;

receiving the second optical signal over the second transmission path by the ingress interface; and assembling and reordering the header cell and the body cell into a packet by a the ingress interface of the second node based on the first and second sequence numbers.

22. The method of claim 21, further comprising transmitting the packet to a switch fabric interface of the second node.

* * * * *